US006986547B2

(12) United States Patent  
Parrish

(10) Patent No.: US 6,986,547 B2
(45) Date of Patent: Jan. 17, 2006

(54) HYBRID VEHICLE INTERIOR COMPONENT

(75) Inventor: Kenneth R. Parrish, Roseville, MI (US)

(73) Assignee: Lear Corporation, Southfield, MI (US)

( * ) Notice: Subject to any disclaimer, the term of this patent is extended or adjusted under 35 U.S.C. 154(b) by 90 days.

(21) Appl. No.: 10/260,752

(22) Filed: Sep. 30, 2002

(65) Prior Publication Data
US 2004/0101652 A1 May 27, 2004

(51) Int. Cl.
B60J 7/00 (2006.01)
(52) U.S. Cl. .............................. 296/193.07; 296/97.23; 296/39.3
(58) Field of Classification Search ........... 296/193.07, 296/39.3, 97.23, 146.7, 75; 181/290; D12/203; 156/293, 219; 428/95, 41.8
See application file for complete search history.

(56) References Cited

U.S. PATENT DOCUMENTS

| 3,337,258 | A | * | 8/1967 | Steinberg | 296/97.23 |
| 3,387,315 | A | * | 6/1968 | Stata | 296/97.23 |
| 3,488,081 | A | * | 1/1970 | Nolen | 296/97.23 |
| 3,930,084 | A | * | 12/1975 | Sheilds | 296/97.23 |
| 3,953,632 | A |   | 4/1976 | Robinson |  |
| 4,054,698 | A | * | 10/1977 | Hamrah | 428/41.8 |
| 4,085,557 | A |   | 4/1978 | Tharp |  |
| 4,377,614 | A | * | 3/1983 | Alfter et al. | 296/97.23 |
| 4,399,176 | A | * | 8/1983 | Bell et al. | 296/97.23 |
| 4,465,720 | A | * | 8/1984 | Bell et al. | 296/97.23 |
| 4,828,898 | A | * | 5/1989 | Bailey | 428/95 |
| 4,829,627 | A | * | 5/1989 | Altus et al. | 296/97.23 |
| 4,830,916 | A |   | 5/1989 | Fukuda et al. |  |
| 4,887,862 | A |   | 12/1989 | Bassi |  |
| 4,898,419 | A |   | 2/1990 | Kenmochi et al. |  |
| 5,178,434 | A |   | 1/1993 | Krebs |  |
| 5,297,842 | A | * | 3/1994 | Hayashi | 296/146.7 |
| 5,439,725 | A | * | 8/1995 | Roberts | 428/95 |
| 5,573,294 | A | * | 11/1996 | Mack | 296/97.23 |
| 5,658,637 | A | * | 8/1997 | Volz | 428/95 |
| 5,683,780 | A | * | 11/1997 | Rodger et al. | 428/95 |
| 5,702,457 | A |   | 12/1997 | Walch et al. |  |
| 5,741,335 | A |   | 4/1998 | Gerber et al. |  |
| D394,835 | S | * | 6/1998 | Crute-Williams et al. | D12/203 |
| 5,851,626 | A |   | 12/1998 | McCorry et al. |  |
| 5,876,827 | A |   | 3/1999 | Fink et al. |  |
| 5,961,555 | A |   | 10/1999 | Huebner |  |
| RE36,677 | E | * | 5/2000 | Reuben | 156/219 |
| 6,093,469 | A | * | 7/2000 | Callas | 428/95 |
| 6,099,771 | A |   | 8/2000 | Hudkins et al. |  |
| 6,120,507 | A |   | 9/2000 | Allard et al. |  |
| D432,477 | S | * | 10/2000 | Gorodetsky | D12/203 |

(Continued)

FOREIGN PATENT DOCUMENTS

EP 0 712 617 5/1996

OTHER PUBLICATIONS

Sulzer Anatomica, pp. 1-2.

Primary Examiner—Kiran B. Patel
(74) Attorney, Agent, or Firm—MacMillan, Sobanski & Todd, LLC

(57) ABSTRACT

An interior component for a motor vehicle has a first front surface region made from a first polyurethane, and a second front surface region integrated with the first region and made from a material different from the first polyurethane. For example, the second region may be carpeting or a region of polyurethane having a different color from the first region. In one embodiment, the interior component is a floor for a motor vehicle.

3 Claims, 3 Drawing Sheets

U.S. PATENT DOCUMENTS

| | | |
|---|---|---|
| 6,132,838 A | 10/2000 | Hiratsuka et al. |
| D433,367 S * | 11/2000 | Iacovelli .................... D12/203 |
| 6,168,628 B1 | 1/2001 | Huebner |
| 6,171,341 B1 | 1/2001 | Boileau et al. |
| 6,203,575 B1 | 3/2001 | Farey |
| 6,224,133 B1 * | 5/2001 | Abramoski et al. ........... 296/75 |
| 6,228,120 B1 | 5/2001 | Leonard et al. |
| 6,258,202 B1 * | 7/2001 | Callas ........................ 156/293 |
| 6,340,513 B1 | 1/2002 | Hammond et al. |
| D454,323 S * | 3/2002 | Lu ............................ D12/203 |
| 6,382,350 B1 * | 5/2002 | Jezewski et al. ............ 181/290 |
| 6,383,599 B1 | 5/2002 | Bell et al. |
| 6,695,374 B1 * | 2/2004 | Gebreselassie et al. .... 296/39.3 |
| 6,736,442 B2 * | 5/2004 | Gebreselassie et al. .. 296/97.23 |
| 2001/0008673 A1 | 7/2001 | Nagata et al. |
| 2001/0046581 A1 | 11/2001 | Brumbelow et al. |

* cited by examiner

HYBRID VEHICLE INTERIOR COMPONENT

BACKGROUND OF THE INVENTION

This invention relates in general to motor vehicle components, and in particular to motor vehicle interior components such as floors, instrument panels and door panels.

One method to improve the aesthetics and/or functionality of motor vehicle interior components is to make different surface regions from different materials, and/or from materials having different colors or textures. Unfortunately, most such interior components are relatively complicated and costly to manufacture.

Various patents disclose motor vehicle interior components having different surface regions made from different materials. For example, U.S. Pat. No. 5,178,434 to Krebs discloses a vehicle floor wherein a fracture-prone region is covered by a sealing cover assembly having properties of high elongation, fluid impermeability, and good crack or tear-resistance. There is no disclosure of a floor having regions made from polyurethane.

BRIEF SUMMARY OF THE INVENTION

This invention relates to an interior component for a motor vehicle having a first front surface region made from a first polyurethane, and a second front surface region integrated with the first region and made from a material different from the first polyurethane. For example, the second region may be carpeting or a region of polyurethane having a different color from the first region. In a preferred embodiment, the interior component is a floor for a motor vehicle.

The invention also relates to an interior component for a motor vehicle having a front surface made from polyurethane, and a back surface made from a cushioning material which is adhered to the polyurethane. Preferably, the cushioning material is adhered to the polyurethane without the use of an adhesive, taking advantage of the tackiness of the polyurethane until it is totally cured.

Various advantages of this invention will become apparent to those skilled in the art from the following detailed description of the preferred embodiments, when read in light of the accompanying drawings.

DETAILED DESCRIPTION OF THE INVENTION

Figure 1:
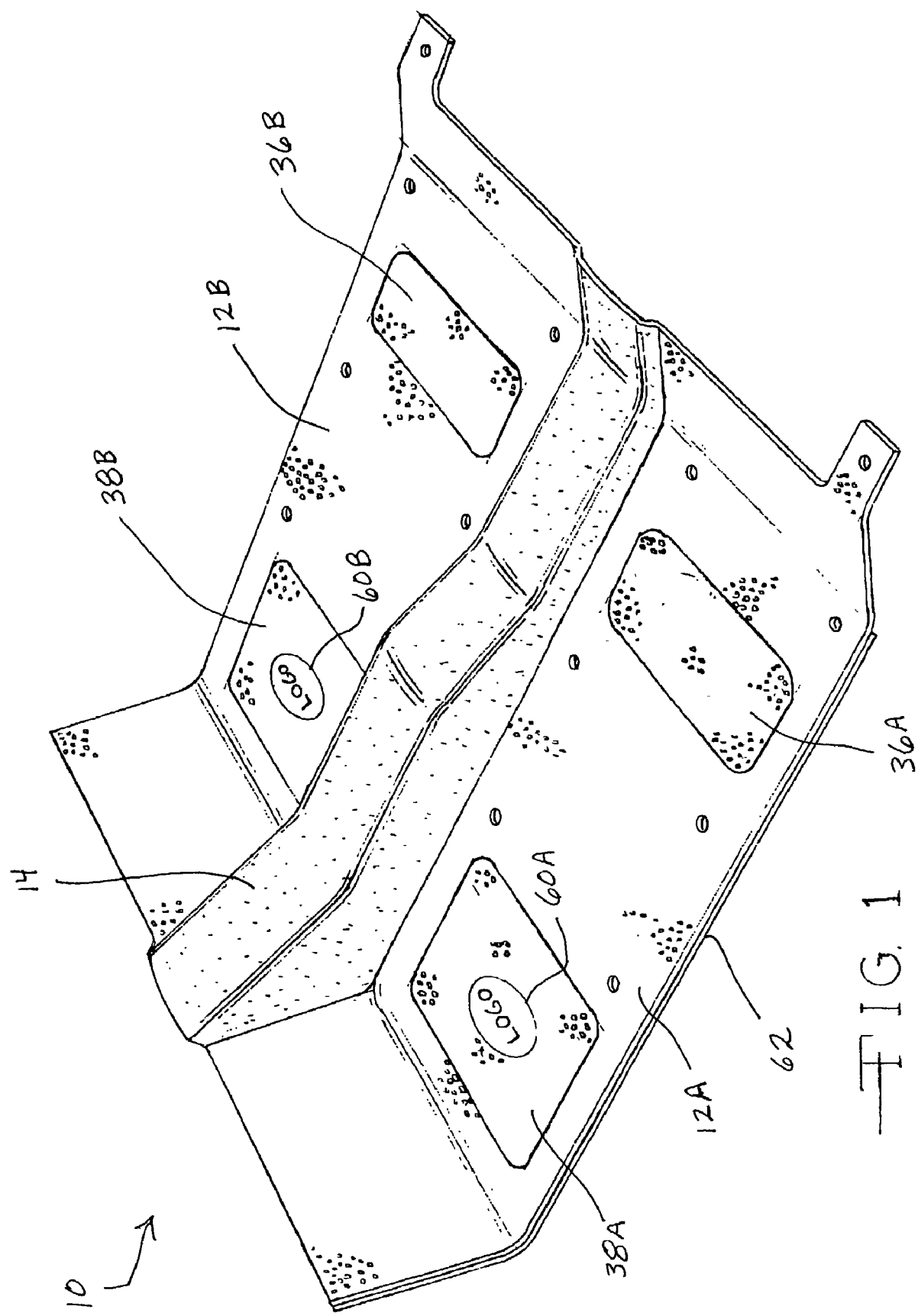
FIG. 1 is a perspective view of a motor vehicle floor made in accordance with the present invention.

The present invention takes advantage of the properties of polyurethane to make hybrid motor vehicle interior components having improved aesthetics and/or functionality and which are relatively easy and inexpensive to manufacture. In one embodiment, the invention relates to an interior component for a motor vehicle having a first front surface region made from a first polyurethane, and a second front surface region integrated with the first region and made from a material different from the first polyurethane. By "front surface region" is meant that the region includes at least the front surface of the component, i.e., the surface which is visible to the occupant when the interior component is mounted in the motor vehicle. The interior component can be practically any component that would benefit from the invention, such as a floor, instrument panel or door panel. Usually the interior component is manufactured by a molding process such as vacuum forming.

The first polyurethane can be any type of polyurethane suitable for forming a front surface region of the interior component. Preferably, the polyurethane is sprayed into a mold to form the interior component region. Polyurethanes are well known resins that are produced by the condensation reaction of a polyisocyanate and a hydroxyl-containing material such as a polyol derived from propylene oxide or trichlorobutylene oxide. When sprayed, the polyisocyanate and the polyol flow from separate containers into a spray line where they are mixed to form polyurethane before exiting the spray nozzle. The polyurethane remains a liquid immediately after mixing but cures and sets up into a solid. Before it is completely cured, the polyurethane has a tackiness that can play an important role in the invention. Different colored pigments, foaming agents, or other desired materials can be mixed with the polyol or polyisocyanate before spraying to obtain a desired product. The polyurethane can be hard or relatively soft depending on the catalyst and other materials used. Spray polyurethanes are available from BASF Corp. and other manufacturers. Equipment for spraying polyurethanes is also available from numerous manufacturers.

The second front surface region is made from a material which is different from the first polyurethane. By "different" is meant any type of difference in the material. This can include different types of material, such as carpeting or a different plastic instead of polyurethane, or different colors. The different material could also be a polyurethane having a layer of paint or other material on its surface.

The second front surface region is integrated with the first region; the first and second regions are fastened together into an integrated unit. The first and second regions can be fastened together by any suitable method. In some preferred embodiments, the invention takes advantage of the tackiness of the polyurethane before it is completely cured to fasten the first and second regions together without the use of adhesive or fasteners. This will be described in more detail below.

FIG. 1 illustrates a motor vehicle floor 10 made in accordance with the invention. The floor 10 includes first front surface regions 12A and 12B made from a first polyurethane. The first regions 12A and 12B are shown having a grained surface texture, but they could also have other surface textures or a smooth surface. The floor 10 also includes a second front surface region 14 made from a material different from the first polyurethane. In the illustrated embodiment, the second region 14 is made from carpeting, but it could be made from any other materials different from the first polyurethane. The second region 14 forms the tunnel of the floor 10 in the embodiment shown, but the second region could be located at any position on the floor.

Figure 2:
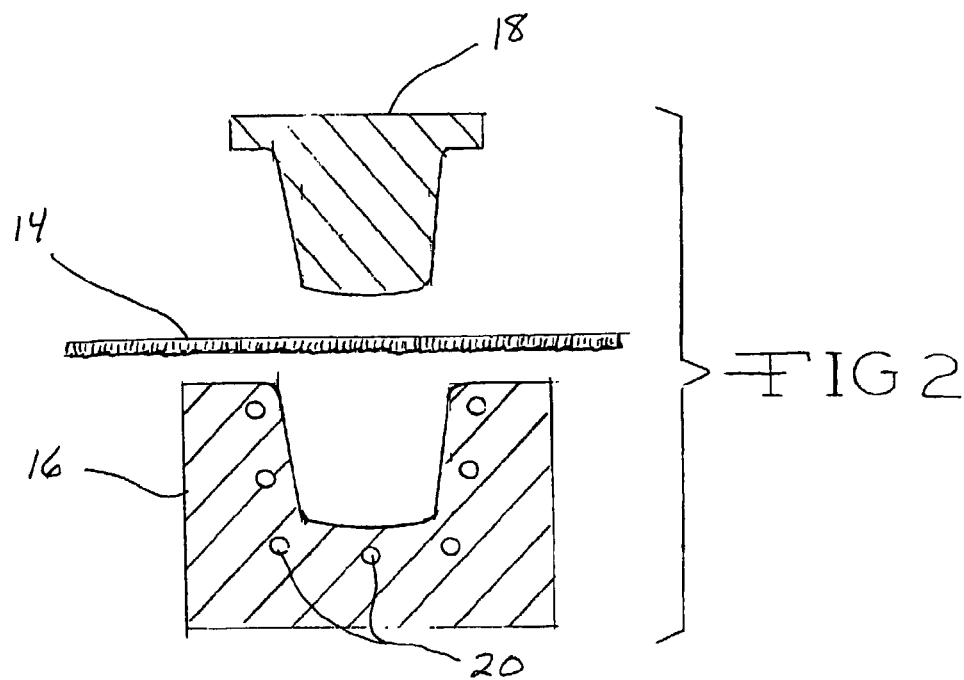
FIGS. 2 and 3 are side views in cross-section showing a carpet being molded into a desired shape.
Figure 3:
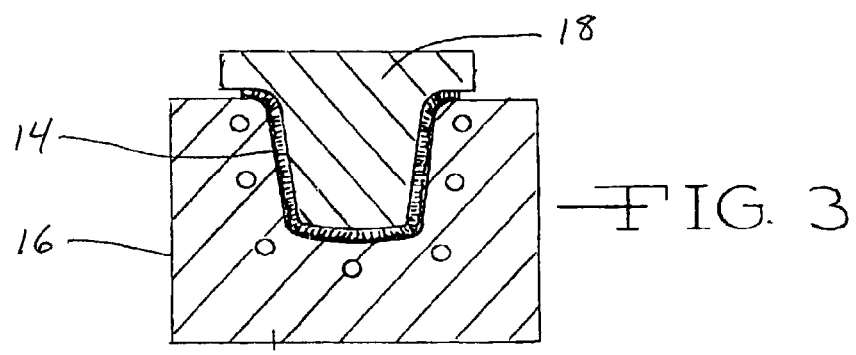

FIGS. 2 and 3 illustrate a process of forming a piece of carpeting into the desired shape of the tunnel. A piece of carpeting forming the second region 14 is forced into a mold 16 with the use of a mandrel 18 and heated so that it forms and maintains the desired shape. The mold may include heat tubes 20 to provide heat during the molding. There are many other ways of molding the carpeting.

Figure 4:
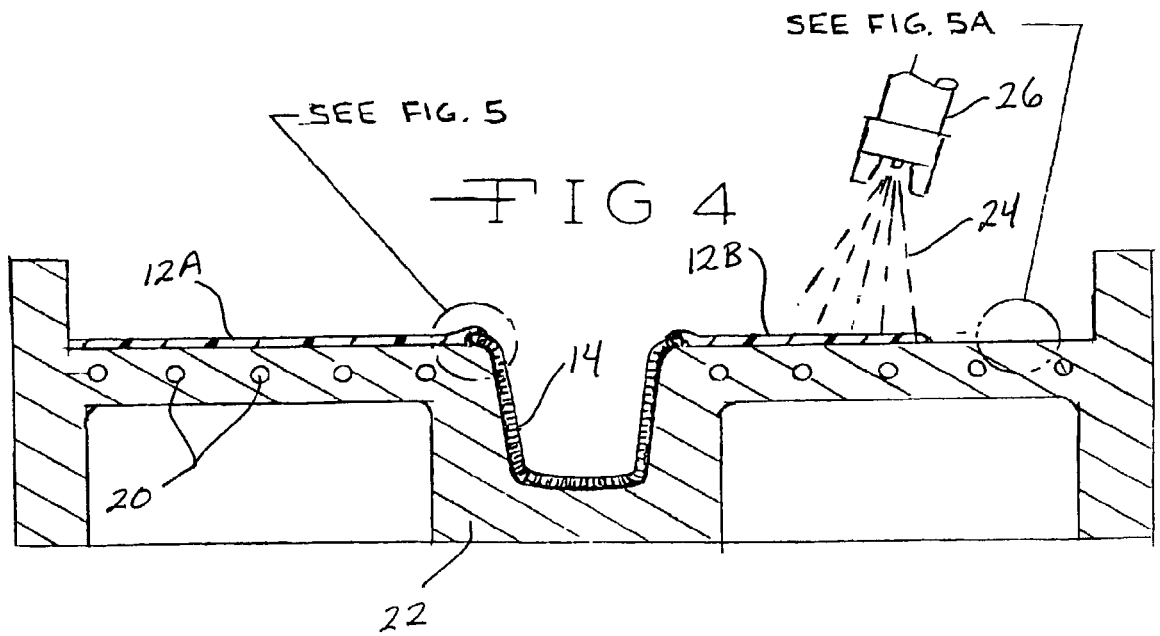
FIG. 4 is a side view in cross-section showing a first polyurethane being sprayed around the carpet in a mold during the process of making the floor shown in FIG. 1.
Figure 5:
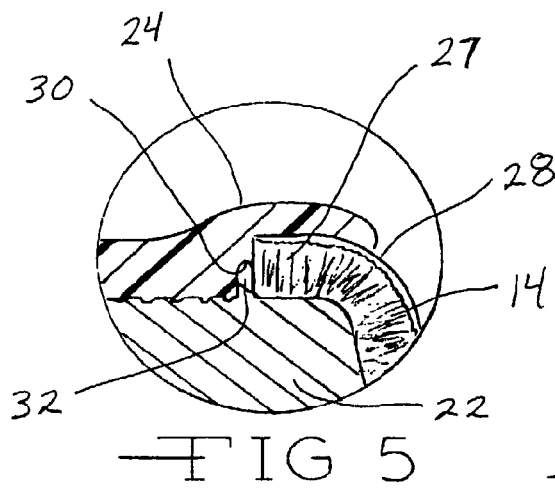
FIG. 5 is an enlarged view of a portion of FIG. 4 showing the attachment of the polyurethane to the carpet.
Figure 5A:
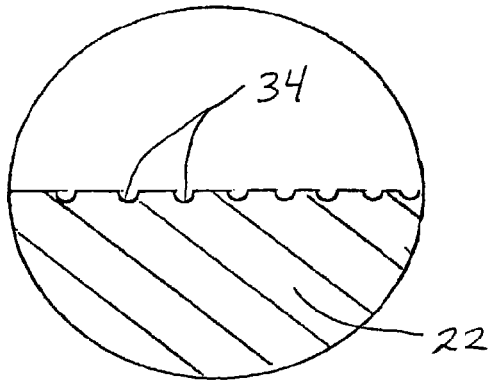
FIG. 5A is an enlarged view of a portion of FIG. 4 showing a grain pattern on the surface of the mold which is picked up and retained by the front surface of the polyurethane.

FIGS. 4 through 5a illustrate a preferred process according to the invention of making the vehicle floor shown in FIG. 1. As shown in FIG. 4, the formed second region 14 of carpeting is placed into another, larger mold 22. Then a polyurethane 24 is sprayed from a spray nozzle 26 along the sides of the second region 14 to form the first regions 12A and 12B. The mold 22 has heat tubes 20 to facilitate curing of the polyurethane 24. The sprayed polyurethane 24 attaches to the second region 14 of carpeting to form an integrated unit.

FIG. 5 illustrates a preferred method of attaching the polyurethane 24 to the carpeting 14. The polyurethane 24 is sprayed so that it overlaps the edge 27 of the carpeting 14 and is attached to the back surface 28. This spraying technique along with the tackiness of the polyurethane 24 until cured provides a strong attachment of the polyurethane 24 to the carpeting 14.

As further shown in FIG. 5, preferably the polyurethane 24 is formed such that a clean line is provided between the polyurethane 24 and the edge 27 of the carpeting 14. This can be achieved in many different ways. In the embodiment shown, the polyurethane 24 is formed to have a groove 30 in its front surface along the edge of the carpeting. The groove 30 can be formed by any suitable method, using any suitable device. In the embodiment shown, a ridge 32 is provided on the mold 22 to form the groove 30 in the polyurethane 24.

FIG. 5A shows that the mold 22 can have a grained 34 surface texture or other desired surface texture. When the polyurethane 24 is sprayed into the mold 22, it flows into the grained areas 34 and retains the grained texture on its front surface upon curing. If desired, different types of grains or other surface textures can be provided on different portions of the mold surface.

Referring again to FIG. 1, the floor 10 also includes third front surface regions 36A and 36B and fourth front surface regions 38A and 38B made from materials that are different from the first polyurethane of the first front surface regions 12A and 12B. In the embodiment shown, the third and fourth front surface regions are formed as inserts in the first front surface regions. The third and fourth front surface regions can be made from any type of materials that are different from the first polyurethane. In a preferred embodiment, the third and fourth front surface regions are made from a polyurethane having a different color from that of the first front surface region. For example, the third and fourth front surface regions can be colored blue or yellow while the first front surface region is colored black. The different colors can be provided by adding pigments to the polyurethanes or by applying paint on the surface of the polyurethanes.

Figure 6:
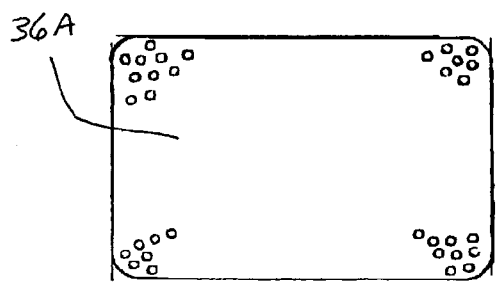
FIG. 6 is a top view of a piece of second polyurethane for use in the floor of FIG. 1, the second polyurethane being different from the first polyurethane.
Figure 7:
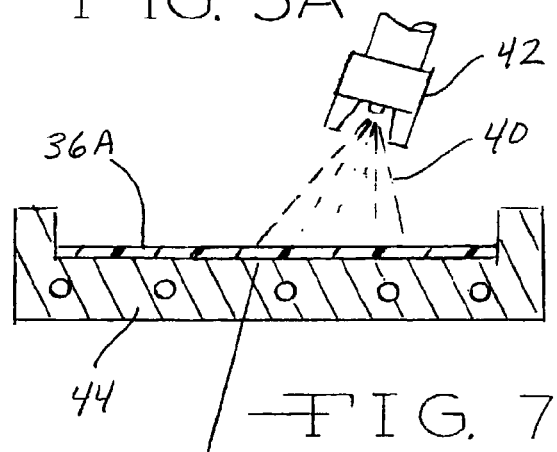
FIG. 7 is a side view in cross-section showing the piece of second polyurethane being formed by spraying in a mold.
Figure 8:
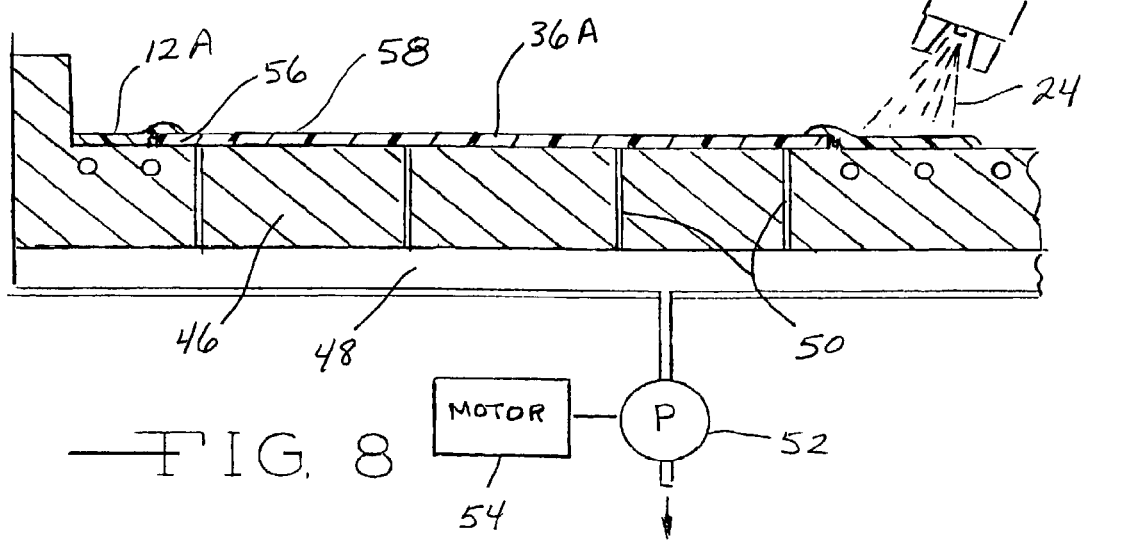
FIG. 8 is a side view in cross-section showing the first polyurethane being sprayed around the piece of second polyurethane during the process of making the floor.

FIGS. 6 through 8 illustrate a preferred process of making the vehicle floor 10 including the first region 12A of first polyurethane and the third region 36A of a second polyurethane. As shown in FIG. 7, the second polyurethane 40 is sprayed from a spray nozzle 42 into a relatively small mold 44 to form the third region 36A. FIG. 6 shows the third region 36A having been cured and removed from the mold 44. As an alternative to molding the third region 36A, a piece of polyurethane or other plastic could be obtained separately and used as the third region. The piece could be cut to shape or it could be vacuum formed. As shown in FIG. 8, the third region 36A is placed into a larger mold 46. The mold 46 can be provided with a vacuum chamber 48 and passages 50, and a pump 52 and motor 54 to draw a vacuum, to hold the third region 36A in place. The polyurethane 24 forming the first region 12A is sprayed from a spray nozzle 26 around and along the perimeter of the third region 36A so that it overlaps the edges 56 of the third region 36A and is attached to the back surface 58.

As shown in FIG. 1, inserts in the form of logos 60A and 60B are provided in the fourth front surface regions 38A and 38B. Other types of inserts can be used, such as emblems or pictures. The inserts may be used to enhance the aesthetics of the interior component. The inserts can be located at other positions on the interior component, such as in the first front surface regions 12A and 12B. For example, the fourth front surface regions 38A and 38B can be removed and the logos 60A and 60B remain in their present position but surrounded by expanded first front surface regions 12A and 12B. The logos 60A and 60B or other inserts are made from a material which is different from the surrounding polyurethane. Preferably, the polyurethane is sprayed around the inserts as described above to attach the inserts to the polyurethane.

In another embodiment, the invention relates to an interior component for a motor vehicle having a front surface made from polyurethane, and a back surface made from a cushioning material which is adhered to the polyurethane. FIG. 1 shows a layer of cushioning material 62 adhered to the back surface of the polyurethane. The cushioning material can be a layer of shoddy or other desired material. Preferably, the cushioning material 62 is adhered to the polyurethane without the use of an adhesive, taking advantage of the tackiness of the polyurethane until it is totally cured.

In accordance with the provisions of the patent statutes, the principle and mode of operation of this invention have been explained and illustrated in its preferred embodiments. However, it must be understood that this invention may be practiced otherwise than as specifically explained and illustrated without departing from its spirit or scope.

What is claimed is:

1. An interior component for a motor vehicle which is a vehicle floor, the floor having a first front surface region made from a first sprayed polyurethane, and a second front surface region integrated with the first region and made from a material different from the first polyurethane, the sprayed polyurethane enabling the first and second regions to be fastened together into an integrated unit without the use of adhesive or fasteners.

2. The interior component as recited in claim 1 wherein the second region is made from a second polyurethane which is different from the first polyurethane.

3. An interior component for a motor vehicle which is a vehicle floor, the floor having a first front surface region made from a first sprayed polyurethane, and a second front surface region integrated with the first region and made from a material different from the first polyurethane, the second region forming a tunnel of the floor, the sprayed polyurethane enabling the first and second regions to be fastened together into an integrated unit without the use of adhesive or fasteners.

* * * * *